United States Patent
Busch

(10) Patent No.: US 8,472,216 B2
(45) Date of Patent: Jun. 25, 2013

(54) CIRCUIT ARRANGEMENT AND CONTROL CIRCUIT FOR A POWER-SUPPLY UNIT, COMPUTER POWER-SUPPLY UNIT AND METHOD FOR SWITCHING A POWER-SUPPLY UNIT

(75) Inventor: Peter Busch, Augsburg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 288 days.

(21) Appl. No.: 13/000,922

(22) PCT Filed: May 25, 2009

(86) PCT No.: PCT/EP2009/056318
§ 371 (c)(1),
(2), (4) Date: Dec. 22, 2010

(87) PCT Pub. No.: WO2010/000544
PCT Pub. Date: Jan. 7, 2010

(65) Prior Publication Data
US 2011/0110129 A1      May 12, 2011

(30) Foreign Application Priority Data
Jul. 3, 2008   (DE) .......................... 10 2008 031 536

(51) Int. Cl.
*H02H 7/10*     (2006.01)
*H02M 7/04*     (2006.01)
*H02M 7/68*     (2006.01)
*H02M 3/24*     (2006.01)

(52) U.S. Cl.
USPC .................. 363/50; 363/49; 363/84; 363/85; 363/89; 323/901; 323/908

(58) Field of Classification Search
USPC .................... 363/49, 50, 84, 85, 89; 323/901, 323/908
See application file for complete search history.

(56) References Cited

U.S. PATENT DOCUMENTS

| | | | |
|---|---|---|---|
| 3,569,826 A | * | 3/1971 | Burnett ......................... 361/170 |
| 5,650,924 A | | 7/1997 | Huh |

(Continued)

FOREIGN PATENT DOCUMENTS

| | | |
|---|---|---|
| DE | 30 45 715 | 6/1982 |
| DE | 101 06 132 | 8/2002 |

(Continued)

OTHER PUBLICATIONS

VDE—Norm "Eirtrichtungen der Informationstechnik—Sicherheit" DIN EN 60950-1 (which corresponds to the international Norm IEC 60950-1), 1 page English Summary.

*Primary Examiner* — Bao Q Vu
(74) *Attorney, Agent, or Firm* — DLA Piper LLP (US)

(57) ABSTRACT

A circuit arrangement includes a switching element that switches a load current, a current-limiting element connected in series to the switching element, a bistable first relay connected in parallel to the switching element and the current-limiting element, and a control circuit that switches the power-supply unit from a first operating state to a second operating state in which a load current for generating a DC voltage flows from the power grid to the power-supply unit, such that the control circuit turns on the switching element for a first time period during switching of the power-supply unit from the first to the second operating state, to turn the bistable relay on during the first time period, and to turn the switching element off at the end of the first time period.

30 Claims, 14 Drawing Sheets

U.S. PATENT DOCUMENTS

| | | |
|---|---|---|
| 5,777,866 A | 7/1998 | Jacobs et al. |
| 5,994,889 A | 11/1999 | Goller et al. |
| 6,316,844 B1 | 11/2001 | Arima |
| 6,690,150 B2 * | 2/2004 | Pelletier et al. ............... 323/324 |
| 7,283,896 B2 | 10/2007 | Lin |
| 2002/0012258 A1 | 1/2002 | Nagai et al. |
| 2003/0218838 A1 * | 11/2003 | Poulsen .......................... 361/23 |
| 2006/0139965 A1 | 6/2006 | Gan et al. |
| 2007/0291522 A1 | 12/2007 | Toba et al. |
| 2008/0084718 A1 | 4/2008 | Ingman |

FOREIGN PATENT DOCUMENTS

| | | |
|---|---|---|
| DE | 10 2005 049 909 A1 | 7/2006 |
| EP | 0 179 982 B1 | 5/1986 |
| EP | 1 176 688 | 1/2002 |
| EP | 1 231 698 | 8/2002 |
| EP | 1 783 887 | 5/2007 |
| JP | 58-212369 | 12/1983 |
| JP | 62-233815 | 10/1987 |
| JP | 2-133808 | 5/1990 |
| JP | 3-198661 | 8/1991 |
| JP | 8-308236 A | 11/1996 |
| JP | 2002-010492 | 1/2002 |
| JP | 2004-72846 | 3/2004 |
| JP | 2005-210809 A | 8/2005 |

* cited by examiner

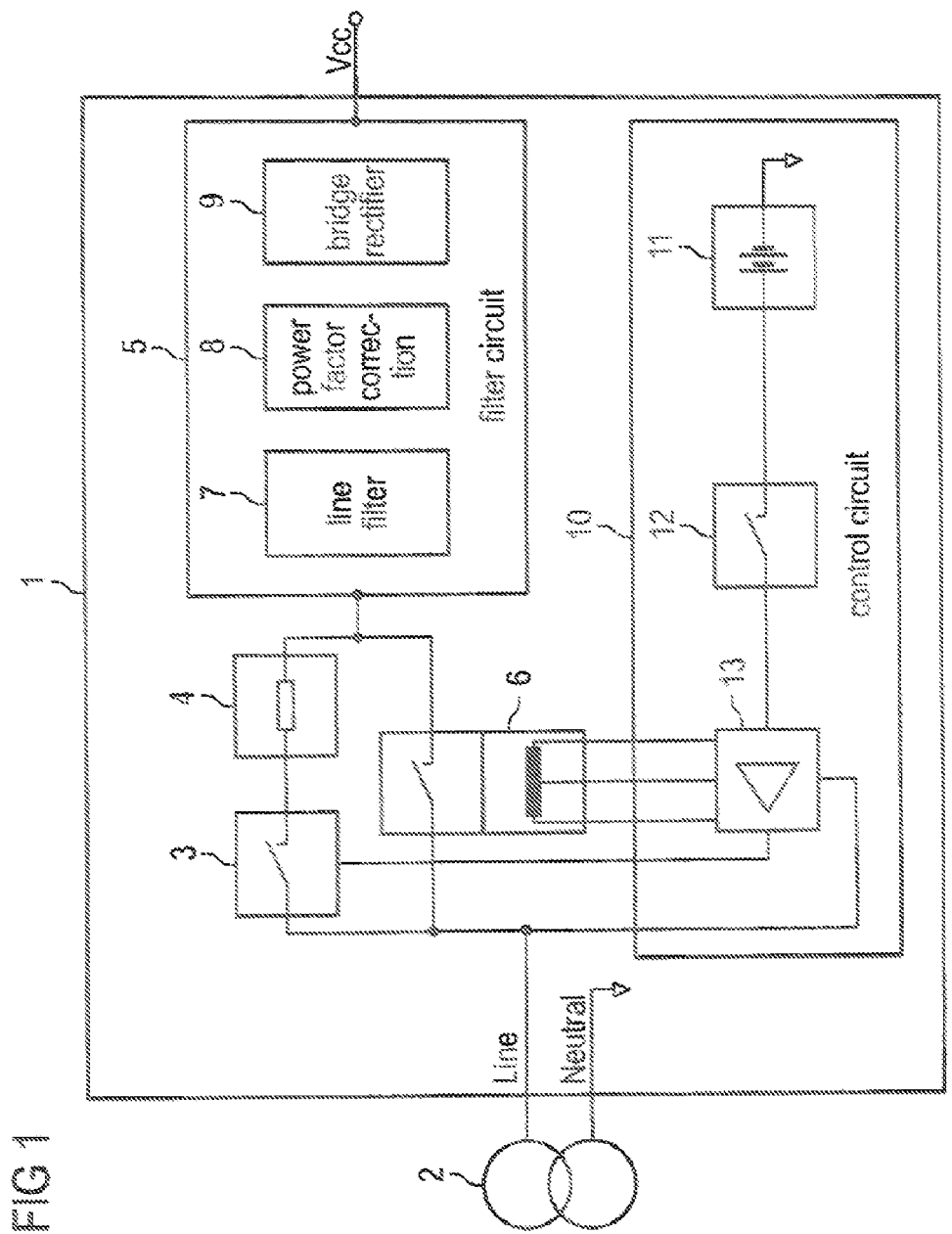

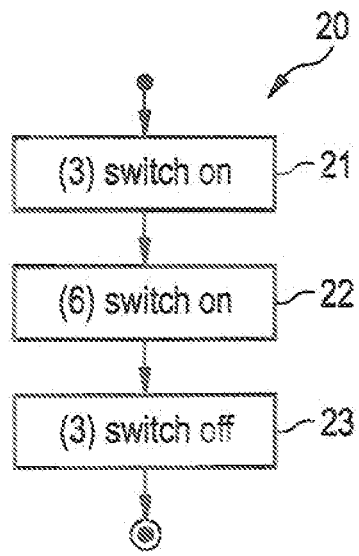
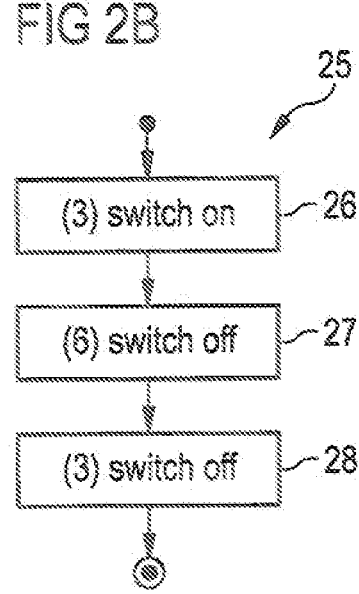

CIRCUIT ARRANGEMENT AND CONTROL CIRCUIT FOR A POWER-SUPPLY UNIT, COMPUTER POWER-SUPPLY UNIT AND METHOD FOR SWITCHING A POWER-SUPPLY UNIT

RELATED APPLICATIONS

This is a §371 of International Application No. PCT/EP2009/056318, with an international filing date of May 25, 2009 (WO 2010/000544 A2, published Jan. 7, 2010), which is based on German Patent Application No. 102008031536.2, filed Jul. 3, 2008, the subject matter of which is incorporated by reference.

TECHNICAL FIELD

This disclosure relates to a circuit arrangement for a power-supply unit for generating at least one DC voltage from an AC voltage of a power grid. The disclosure further relates to a control circuit for such a power-supply unit, a computer power-supply unit comprising such a circuit arrangement, and a method for switching a power-supply unit to generate a DC voltage from an AC voltage of a power grid.

BACKGROUND

Power supply units for generating at least one DC voltage from an AC voltage, generally a mains voltage of a power grid, are widely known. In particular, an ever greater number of devices in telecommunications and consumer electronics require such power-supply units to generate a rectified low voltage in the range of 1 to 12 V from the typical grid voltage of 230 V. The power-supply units that are used must also satisfy different and partially contradictory requirements.

The power-supply units should be switchable on and off electronically, i.e., without actuating a mechanical mains switch. This has the advantage, among others, that it is possible to do without high-voltage-compatible, relatively expensive power switches and expensive cabling and electromagnetic shielding in a device housing. In addition, such a device can be switched on via a timer or other electronic controller.

The power-supply unit and the device connected to it should consume as little power from the power grid as possible in a shut-off or standby state to avoid unnecessary use of energy. Currently available devices generally consume a few watts of power in so-called "standby" mode, which leads to unnecessary emission of greenhouse gases for power generation.

The efficiency of the power-supply unit should be as high as possible and the noise power fed from it into the power grid should be as low as possible. For this purpose, the power-supply unit must comply with increasingly strict requirements of regulatory agencies and power-grid operators.

Switching power-supply units with upstream line filters and circuits for correcting the power factor are generally used for supplying relatively large and rapidly varying loads. A clock frequency or a duty factor of a control signal is generally used to control the load. A disadvantage of such circuits is that they have a relatively high power loss, particularly in the so-called standby mode, an operating mode with a very low output power.

It could therefore be helpful to provide a circuit arrangement that satisfies the requirements mentioned above particularly well. In particular, it could be helpful to provide a control circuit for such a circuit arrangement, whose power consumption from a power grid in the off-state is minimal. In at least one operating state, the arrangement should not consume any electrical energy from the power grid.

SUMMARY

We provide a circuit arrangement for a power-supply unit for generating at least one DC voltage from an AC voltage of a power grid including a switching element that switches a load current of the power-supply unit, a current-limiting element connected in series to the switching element that limits a current surge when the switching element is turned on, a bistable first relay connected in parallel to the switching element and the current-limiting element that retains the load current, and a control circuit that switches the power-supply unit from a first operating state, in which no load current flows from the power grid to the power-supply unit, to a second operating state in which a load current for generating a DC voltage flows from the power grid to the power-supply unit, wherein the control circuit turns on the switching element for a first time period during switching of the power-supply unit from the first to the second operating state, to turn the bistable relay on during the first time period, and to turn the switching element off at the end of the first time period.

We also provide a control circuit for switching a power supply unit from a first operating state, in which no load current flows from a power grid to the power-supply unit, into a second operating state, in which a load current for generating a DC voltage flows from the power grid to the power-supply unit including a first switching stage having an energy storage device that operates the first switching stage and an activation element, wherein the first switching stage monitors the activation element in the first operating state and, upon recognizing an activation signal from the activation element, generates a first control signal, and a second switching stage coupled to the first switching stage and having at least one amplifier element for controlling a relay with a second control signal and a supply circuit that supplies the second switching stage with a supply voltage obtained from the power grid, wherein the second switching stage supplies the relay to switch a load current of the power-supply unit with the supply voltage when the first control signal is received.

We further provide a computer power-supply unit with a circuit arrangement.

We also provide a computer power-supply unit with a control circuit.

BRIEF DESCRIPTION OF THE DRAWINGS

FIG. 1 shows a schematic representation of a circuit arrangement for a power-supply unit.

FIGS. 2A and 2B show flow charts for turning a circuit arrangement according to FIG. 1 on and off.

DETAILED DESCRIPTION

Figure 3:
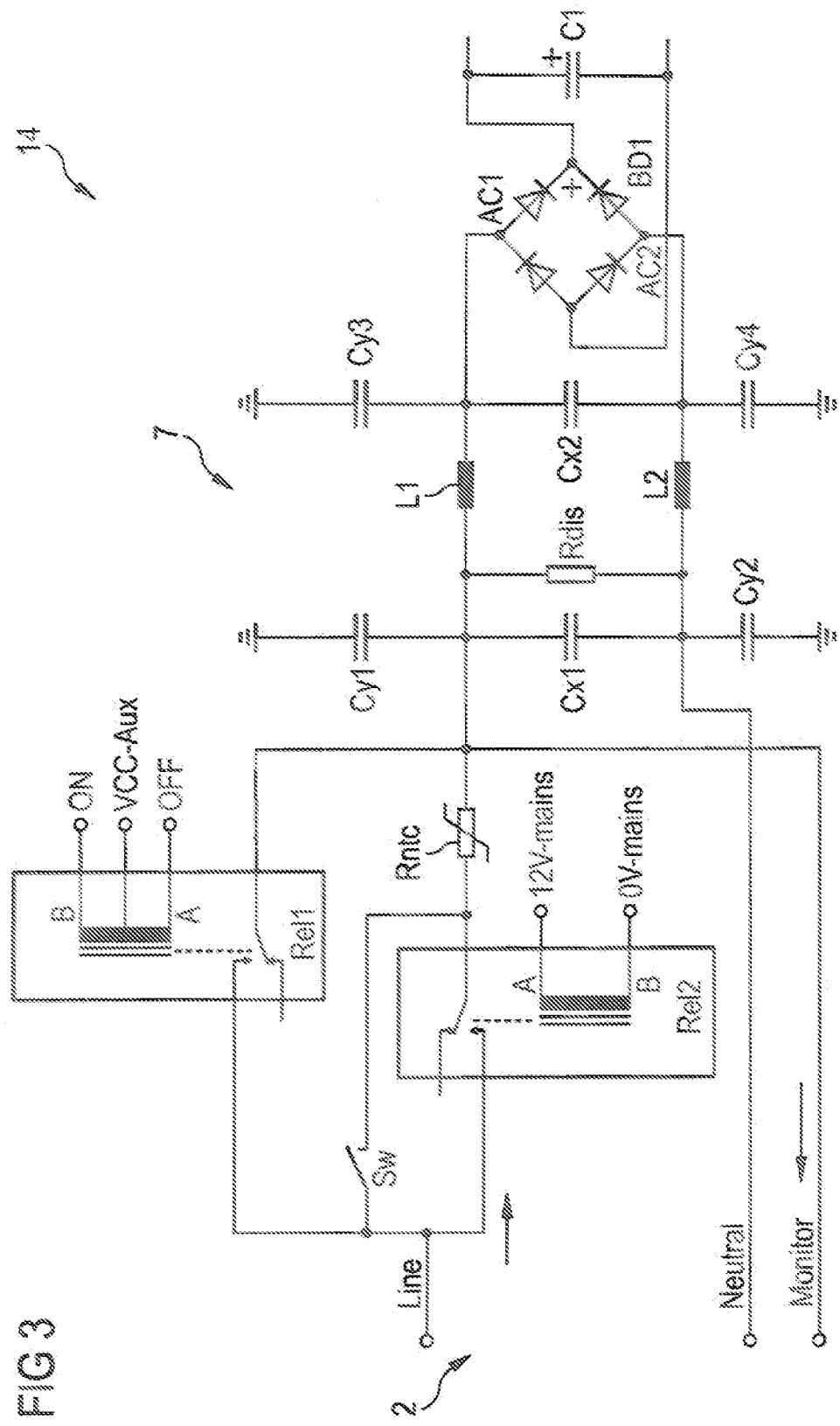
FIG. 3 shows a first configuration of a power input circuit.

A first circuit arrangement for a power-supply unit for generating at least one DC voltage from an AC voltage of a power grid will be described. The circuit arrangement comprises a switching element for switching a load current of the power-supply unit, a current-limiting element connected in series to the switching element for limiting a current surge when the switching element is turned on, a bistable first relay connected in parallel to the switching element and the current-limiting element for retaining the load current, and a control circuit for switching the power-supply unit from a first operating state, in which no load current flows from the power grid to the power-supply unit, to a second operating state, in which a load current for generating a DC voltage flows from the power grid to the power-supply unit to generate a DC voltage, wherein the control circuit is set up to turn on the switching element for a first time period during switching of the power-supply unit from the first to the second operating state, to turn the bistable relay on during the first time period, and to turn the switching element off at the end of the first time period.

Such a circuit arrangement has the advantage, among others, that current peaks during the switching-on of the power-supply unit are avoided by the current-limiting element. At the same time, the power loss caused by the current-limiting element does not occur in the normal operation of the power-supply unit. The bistable relay requires electrical energy only during the switching processes and thus does not cause power loss either in the on-state or in the off-state. Since the bistable relay for retaining the load current is switched only in a potential-free state, it need not be capable of withstanding high voltage peaks during switching.

The circuit arrangement may comprise a first switching stage that comprises an energy storage device for supplying the first switching stage and an operating element, wherein the first switching stage is set up to generate a first control signal when the operating element is actuated, and a second switching stage coupled to the first switching stage that comprises an amplifier element for generating a second control signal for controlling the switching element.

By using a two-stage circuit arrangement, the load on the energy storage device can be reduced so that conventional energy storage devices, such as so-called "CMOS" batteries, which are already used in electronic devices, can be used for switching on the power-supply unit, without the danger of a premature discharge of the battery.

The switching element may comprise a second relay and the second switching stage comprises a supply circuit for supplying the second relay with an operating voltage obtained from the power grid. By using an additional supply circuit for supplying the second relay with an operating voltage obtained from the power grid, the load on an energy storage device provided in the circuit arrangement can be further reduced.

The switching element may also comprise a semiconductor switching element, in particular a thyristor or symistor. The energy consumption of the control circuit can be further reduced by using semiconductor switching elements. A supply circuit for supplying the second switching stage can then be omitted.

The control circuit may further comprise an integrated circuit, in particular, a microcontroller that controls the switching element and the first relay. The integrated circuit may be set up to monitor the at least one DC voltage and the AC voltage of the power grid.

The use of an integrated circuit, in particular a microcontroller, for controlling and monitoring the circuit arrangement allows a particularly flexible and efficient control of the circuit arrangement.

The control circuit may be set up to switch the power-supply unit from the second operating state into the first operating state, in which case the control circuit turns on the switching element for a second time period during the switching of the power-supply unit from the second into the first operating state, turns off the bistable relay during the second time period and turns off the switching element at the end of the second time period. By switching the switching element during the switching-off of the bistable relay, voltage peaks are prevented even while the power-supply unit is being switched off.

A second control circuit is described for switching a power-supply unit from a first operating state, in which no load current flows from the power grid to the power-supply unit, into a second operating state, in which a load current for generating a DC voltage flows from the power grid to the power-supply unit.

The control circuit comprises a first switching stage, having an activation element, wherein the first switching stage is set up to monitor the activation element in the first operating state and, upon recognizing an activation signal from the activation element, to generate a first control signal, and a second switching stage coupled to the first switching stage and having at least one amplifier element for controlling a relay with a second control signal and a supply circuit for supplying the second switching stage with a supply voltage obtained from the power grid, wherein the second switching stage is set up to supply the relay for switching a load current of the power-supply unit with the supply voltage when the first control signal is received.

Such a control circuit has the advantage that energy consumption from the power grid can be avoided or at least minimized in the first operating state, and energy consumption from the energy storage device during the switching of the power-supply unit from the first operating state into the second operating state is likewise minimized.

The first switching stage may generate at least one voltage pulse as a first control signal and transmits it to the second switching stage, and the second switching stage activates the supply circuit only when the voltage pulse has been received. Such a circuit, in which the energy for activating the second switching stage is provided by the transmission of a voltage pulse from the first switching stage, does not draw any electrical energy from the power grid in the first operating state.

The above-mentioned circuit arrangements and control circuits are particularly suited for integration into a computer power-supply unit.

A method for switching a power-supply unit for generating at least one DC voltage from an AC voltage of a power grid is described, wherein the following steps are performed by a control circuit during the switching of the power-supply unit from a first operating state into a second operating state:

at the beginning of a first time period, turning on a circuit element connected in series to a current-limiting element for switching a load current of the power-supply unit, during the first time period, turning on a bistable first relay for retaining the load current, wherein this relay is connected in parallel to the switching element and the current-limiting element, turning off the switching element at the end of the first time period.

With the above-described steps, energy consumption from the power grid in the first operating state is avoided or minimized, power loss in the second operating state is minimized and interference during the switching from the first into the second operating state is limited.

The use of the above-mentioned method in a computer system for providing an energy-saving mode, in which the computer system does not draw any electric power from the power grid is disclosed.

Additional details and advantages in the extensive description below. Our apparatus will be explained in detail below using figures with reference to examples.

Before specifics are explained in detail with reference to FIGS. 1-13, a conventional power input circuit will first be described with reference to FIG. 14.

Figure 14:
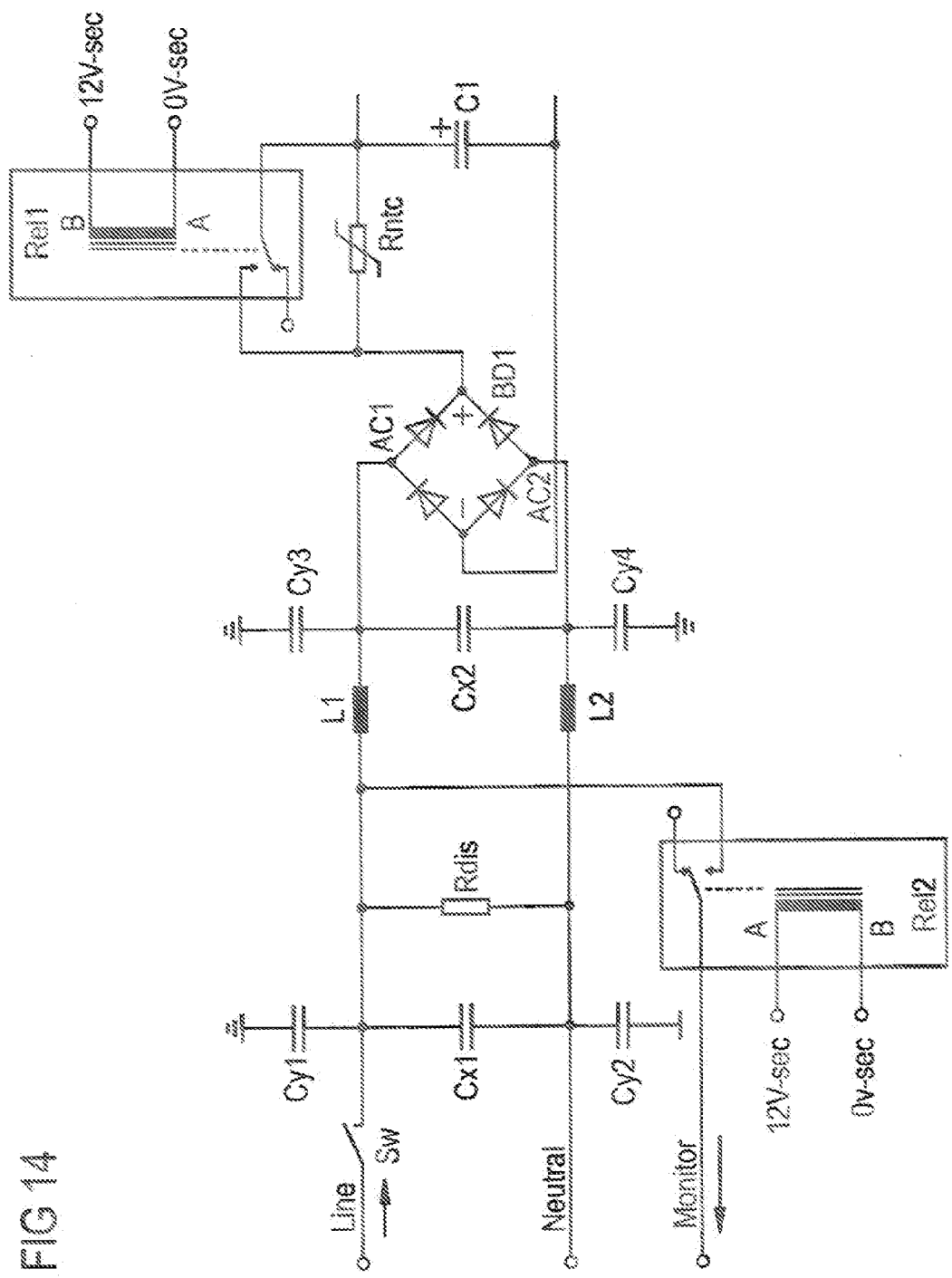
FIG. 14 shows a conventional power input circuit.

FIG. 14 shows a heavily simplified circuit diagram for a power input circuit of a computer power-supply unit. The actual power-supply unit for converting a primary voltage into a secondary voltage, such as a switching power supply or a switching converter, is not represented in FIG. 14. Such a power-supply unit would be connected in parallel to the storage capacitor C1 at the right side of FIG. 14.

The circuit arrangement according to FIG. 14 is connected to an AC power grid on the primary side, i.e., at the left in FIG. 1. A phase connection Line is coupled via a switch Sw to a line filter, comprising inductive, capacitive and resistive elements L1, L2, Cx1, Cx2, Cy1-Cy4 and Rdis. The line filter ensures that interference caused by the power-supply unit is not transmitted back into the power grid.

Downstream of the line filter, a bridge circuit BD1 is arranged, comprising four diodes that generate a pulsating DC voltage at the nodes + and − from the primary-side AC voltage at the nodes AC1 and AC2. The bridge circuit BD1 in the illustrated example is a so-called "Graetz bridge."

The positive output + of the bridge circuit BD1 is connected via an NTC thermistor Rntc to the storage capacitor C1. The NTC thermistor Rntc prevents a current surge during connection of the mains input to the power grid or the closing of the switch Sw. To avoid the voltage drop generated at the NTC thermistor Rntc during operation of the computer, a relay Rel1 is connected in parallel to the NTC thermistor Rntc. The relay Rel1 is a monostable relay that is turned on by application of a control voltage of, for example, 12 V to control terminals A and B and thus bridges the NTC thermistor Rntc. The relay Rel1 is activated as soon as the actual power-supply unit has begun operation, i.e. generates a secondary DC voltage, and is deactivated as soon as the power-supply unit has been shut off. In the on-state, the relay Rel1 consumes approximately 100 to 300 mW of power.

A switchable monitor output is additionally shown in FIG. 14. The switchable monitor output is controlled by a second monostable relay Rel2. The second relay Rel2 is likewise supplied with a voltage, of 12 V between control terminals A and B during operation of the power-supply unit, in this state, the relay Rel2 connects the power and input voltage Line to the a switch output Monitor. Otherwise, i.e., if the computer supply unit is not in operation, the relay Rel2 cuts off the switch output Monitor from the power grid, so that a power consumption of the connected monitor in the off-state of the computer power-supply unit is prevented. The relay Rel2 likewise constantly consumes energy in the on-state.

The effectiveness of the computer system connected to the circuit arrangement is improved by the two monostable relays Rel1 and Rel2 in the circuit according to FIG. 14. Firstly, the first relay Rel1 prevents an undesired power loss at the NTC thermistor Rntc during operation. Secondly, the second relay Rel2 ensures that the monitor does not draw any power from the power grid when the computer is shut off. Nonetheless parts of the circuit arrangement remain connected to the power grid and therefore consume electrical energy even in the off state. In particular, the line input filter consumes a small amount of power and an additional reactive power from the power grid, even in the off state of the relays Rel1 and Rel2. In addition, the actual power-supply unit remains connected via the NTC thermistor Rntc to the power input, Line. Finally the effectiveness of the power-supply unit in operation is reduced by the fact that the control coils of the relays Rel1 and Rel2 must be supplied with an operating voltage.

FIG. 1 shows a schematic representation of a circuit arrangement 1. The circuit arrangement 1 is connected to a power grid 2, in particular an AC power grid. The power grid 2 is a single-phase alternating current power grid with a phase terminal Line and a neutral conductor Neutral. The phase terminal Line is connected to a switching element 3, for example, a monostable relay or a semiconductor switching element. A current-limiting element 4, a NTC thermistor, for example, is arranged downstream of the switching element 3. The switching element 3 and the current-limiting element 4 are connected in series and supply a filter circuit 5 with the AC voltage from the power grid 2 when the switching element 3 is powered on. A bistable relay 6 is arranged in parallel to the switching element 3 and the current-limiting element 4. The bistable relay 6 can bridge the switching element 3 and the current-limiting element 4.

The filter circuit 5 comprises a line filter 7, a circuit for power factor correction 8 and a bridge rectifier 9. These components are circuits of the type that are known from prior art and therefore need not be explained further.

The circuit arrangement 1 further comprises a control circuit 10. The control circuit 10 serves to control the switching element 3 and the bistable relay 6. For this purpose, the control circuit 10 in the illustrated example comprises an energy storage device 11, e.g., a battery cell, an operating element 12 such as a pushbutton arranged on the front side of a device, and an amplifier circuit 13. If the operating element 12 is actuated, a voltage from the energy storage device 11 is connected to the amplifier circuit 13. To avoid placing an excessive load on the energy storage device 11 when the bistable relay is switched, the amplifier circuit 13 is directly supplied with operating energy from the power grid 2 in an optional refinement.

The switching element 3, the bistable relay 6 and the amplifier circuit 13 do not include any capacitive or inductive components directly at the mains input and therefore do not consume any active or reactive power from the power grid 2 in the off-state. A power-supply unit connected to the circuit arrangement 1 can nevertheless be switched on by the operating element 12, via the control circuit 10. In the illustrated circuit arrangement, no interference impulses occur either, as described below, so that it is possible to do without a primary-side line filter.

The mode of operation of the control circuit 10 will be described in further detail with reference to FIGS. 2A and 2B. FIG. 2A shows a method 20 for switching on a power-supply unit (not shown). FIG. 2B shows a method 25 for switching the power-supply unit off.

The method 20 according to FIG. 2A comprises a first step 21, in which the switching element 3 is turned on by the control circuit 10. For example, the amplifier circuit 13 generates a switching pulse with a duration of 500 ms when it recognizes that the operating element 12 has been closed. For the time period of 500 ms a switching voltage is applied to the control terminal of the switching element 3. During this period of time, the filter circuit 5 and a downstream power-supply unit are supplied via the current-limiting element 4 with a load current from the power grid 2. The current-limiting element 4 prevents an abrupt rise of the current flow and thus prevents interference with the power grid 2 by the power-supply unit.

In an additional step 22, the bistable relay 6 is turned on. For example, the amplifier circuit 13 generates a first switching pulse, with a duration of 20 ms for example, to generate a magnetic field with a first orientation to close the bistable relay 6. Since the switching element 3 is already closed at this time, the switching process of the bistable relay 6 takes place with a very low voltage drop determined by the current-limiting element 4. Therefore, only very slight current surges occur, particularly during closure of the switching contact of the bistable relay 6, so that the bistable relay 6 can be designed particularly simply. In particular, the bistable relay 6 need not be surge-resistant.

In an additional step 23, the switching element 3 is turned off. For example, the amplifier circuit 13 no longer provides a suitable drive voltage for the switching element 3. After the switching element 3 is shut off, a load current for the power-supply unit flows across the bistable relay 6 and this bypasses the current-limiting element 4. Therefore no power loss drops at the current-limiting element 4 or at the switching element 3 or at the bistable relay 6 in the on-state.

in the method 25 according to FIG. 213, an essentially reverse process for turning off the circuit arrangement 1 is illustrated. To avoid break sparking when the bistable relay 6 is shut off, the circuit element 3 is first switched on in a step 26 when the power-supply unit is being turned off. Thus two conduction paths for a load current, via the switching element 3 and the parallel bistable relay 6, are initially closed.

In a further step 27, the bistable relay 6 is shut off. For example, the amplifier circuit 13 can generate a second switching pulse that generates a magnetic field essentially opposite to that from the first switching pulse in a control coil of the bistable relay 6. Since a load current of the power-supply unit can continue to flow via the switching element 3 and the current-limiting element 4, no break spat-king occurs when the bistable relay 6 is opened.

Finally the switching element 3 is opened after a predetermined time, for example, 500 ms in a step 28.

FIG. 3 shows a schematic representation of a first power input circuit 14. The power input circuit 14 connects a power grid 2, in particular a phase input Line, via a line filter 7 and a bridge circuit BD1 to a storage capacitor C1, downstream of which a switching power-supply unit, nm shown in FIG. 3, is arranged.

The circuit arrangement according to FIG. 3 corresponds essentially to the upper part of the schematic arrangement according to FIG. 1, wherein the power factor correction circuit 8 was not shown for reasons of easier representation. In addition, circuitry details such as those for the line filter 7 are shown. The line filter 7 comprises two inductors L1 and L2, six capacitors Cx1, Cx2, Cy1-Cy4 and a resistor Rdis. The bridge rectifier BD1 comprises four semiconductor diodes in a Graetz bridge.

It is additionally shown in FIG. 3 that a switching output for a monitor can be arranged at a node that is situated downstream of a NTC thermistor Rntc and a bistable relay Rel1 and upstream of the line filter 7. The power input circuit according to FIG. 3 therefore does not require an additional relay to implement the switching output for the monitor.

Finally, an additional switch Sw, with which the switching element 3 configured as Rel2 can be bridged, was added between the phase input Line and the NTC thermistor Rntc. The switch Sw serves in particular to be able to switch on the power-supply unit even if the control circuit 10 is no longer available, for example, because an energy storage device 11 is discharged.

It is pointed out that the number of components is not increased in comparison to the configuration shown in FIG. 14. Thus, the properties of the power input circuit can be improved by the alternative arrangement of the components according to FIG. 3, without leading to an increased need for electrical components.

Figure 4:
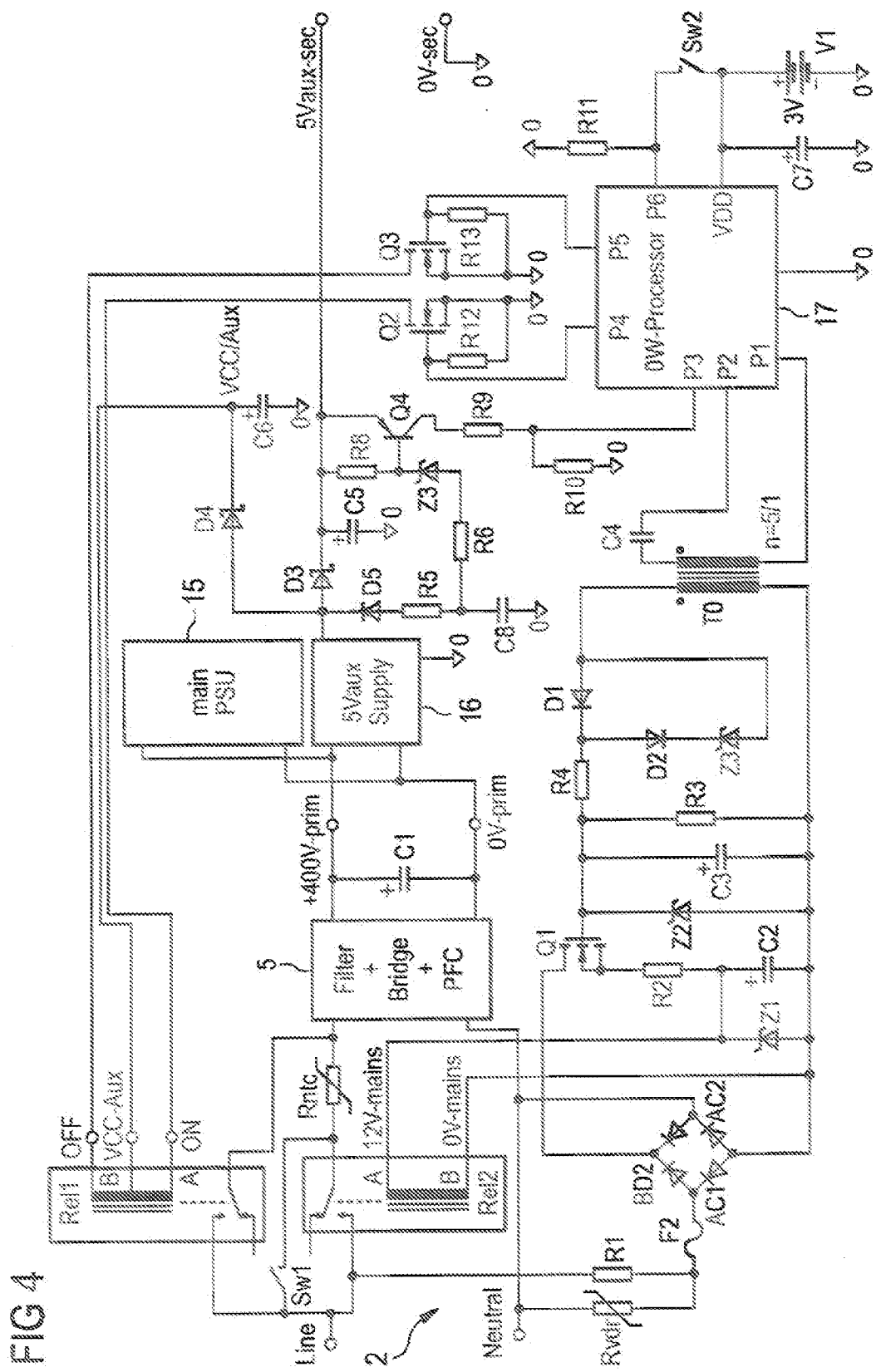
FIG. 4 shows a first control circuit for the power input circuit according to FIG. 3.

FIG. 4 shows a first control circuit for the power input circuit 14 according to FIG. 3. The power input circuit 14 in accordance with FIG. 3 is also shown in FIG. 4, wherein the line filter 7, a power factor correction circuit and the bridge rectifier BD1 are shown jointly as a filter circuit 5.

In FIG. 4 it is recognizable that a main power-supply unit 15 and an auxiliary power-supply unit 16 are connected at the output of the filter circuit 5 in parallel to the storage capacitor C1. The main power-supply unit 15 and the auxiliary supply unit 16 each involve any desired circuit arrangements, particularly forward converters or flyback converters, for converting a primary voltage into a rectified and stabilized secondary voltage. The main power-supply unit 15 serves to supply a connected device, such as a computer system, with a normal operating voltage. On the other hand, the auxiliary power-supply unit 16 supplies only those circuit components with an operating voltage that are required even in a so-called sleep or standby mode. Examples for this are a network card for providing a so-called wake-on-LAN function or the supply of an operating voltage for a main memory when the processor has been temporarily deactivated.

In the circuit arrangement according to FIG. 4, the output voltage is stored in the electrolytic capacitor C1. With an active power factor correction circuit, the generated voltage in the on-state is, e.g., 400 V, but in standby mode it is only the peak value of the currently present mains input voltage. C1 supplies the auxiliary power-supply unit 16 and the main power-supply unit 15. The outputs of the main power-supply unit 15 are not shown here.

In FIG. 4, a part of the output of the auxiliary power-supply unit 16 is illustrated for better comprehension; these are a Schottky diode D3 and an output capacitor C5, which provide an auxiliary output voltage 5 Vaux-sec. In this example, the auxiliary power-supply unit 16 is constructed as a flyback converter and the output of the flyback converter transformer is led out from the auxiliary power-supply unit 16 and connected, for example, to the anode of the diodes D3 and a further diode D4.

Since the driving of the relays Rel1 and Rel2 requires a certain temporal sequence, but is to be performed so as to save as much power as possible, a microcontroller 17 with a very low power consumption was provided in the example illustrated in FIG. 4. For example, microcontrollers of the ATMEL AT Mega Pico Power series have a power consumption of roughly 0.1 µA without a real-time clock (RTC) or 0.85 µA with one. The microcontroller 17 is set up to suppress power consumption from the power grid 2 in a first operating mode, the so-called 0W mode, and is therefore referred to in FIG. 4 and the subsequent circuit diagrams as the 0W processor. To reduce the power consumption of the microcontroller 17 in this operating mode further, the operating clock frequency of the microcontroller in this operating mode is reduced in an optional refinement to, for example, roughly 32 kHz. Of course an application-specific integrated circuit (ASIC), a programmable logic circuit (GAL, PAL) or another suitable integrated circuit can be used in place of the microcontroller.

The microcontroller 17 is supplied with a battery voltage of 3 V by a battery cell V1. The battery cell V1 likewise serves to signal the activation and deactivation of the 0W standby mode via a switch Sw2, e.g., a front button of a computer.

In parallel to the generation of the auxiliary output voltage 5 Vaux-sec with D3 and CS, an additional auxiliary output Vcc-Aux, which generates an auxiliary relay voltage, is provided by D4 and a capacitor C6. This serves to be able to securely shut off the bistable relay Rel1 in case of a power-grid failure or an output short-circuit of the 5 Vaux-sec auxiliary voltage.

A negatively polarized peak value rectifier that is formed from D5, R5 and C8 serves for early recognition of a power-grid failure. The transformed input voltage of the flyback converter can be tapped via the output of the flyback converter transformer from the auxiliary power-supply unit 16 by the negatively polarized, peak value rectifier. However, since the microcontroller 17 cannot process a negative input voltage, a switching stage comprising R6, Z3, R8 and Q4 was constructed that connects the 5 Vaux-sec voltage via R9 and R10 to a terminal P3 of the 0W processor if the negative peak value at C8 exceeds a defined value. That can be, for example, the voltage at C8 if an effective voltage of 70 V or 80 V, i.e., a system undervoltage for a 100 V grid, is present at the input of the power-supply unit.

A transistor Q2 serves to turn on the bistable relay Rel1 and a transistor Q3 to turn it of The switching pulses necessary for this are generated by terminals P4 and P5 of the microcontroller 17. The switching energy is provided by the auxiliary power-supply unit 16, as described above.

A transistor I turns on the monostable relay Rel2 and draws the power necessary to supply an operating coil directly from the power grid 2. For this purpose, the mains voltage is rectified via a separate bridge rectifier BD2 and fed to the drain terminal of the MOSFET transistor Q1. As long as Q1 is not turned on, no current flows and the mains input Line has no load.

A series resistor R1 and a varistor Rvdr are intended to protect the Circuit from a system overvoltage, but Rvdr can also be omitted if the overvoltage protection from Q1 and Z1 is sufficient. A fuse F2 is intended to protect the circuit from component overheating if the transistor Q1 or the relay Rel2 should fail due to short circuit. Z1 also serves to protect the circuit and is not required for normal operation.

Q1 is driven in such a manner that it does not draw any current from the power grid during the off-state. This is achieved by a drive transformer T0 that turns on the MOSFET Q1 with a single positive pulse from the microcontroller 17 and turns it back off with a single negative pulse. The energy for turning on the transistor Q1 is provided via the drive transformer T0.

Two outputs P1 and P2 of the microcontroller 17 are at a low level by default, i.e. 0 V, for example, if the relay Rel2 is to be turned on, P2 is switched for a brief time to a high level, e.g. 3 V and thereafter back to the low level. The switching pulse is fed via a capacitor C4 to T0 and stepped up at its output by the transformation ratio, e.g., 1:5 of the transformer T0. A capacitor C3 is chanted to a voltage of e.g., 15 V via D1 and R4. C4 is not intended to attenuate the pulse, but instead to prevent the saturation of T0 in case of possible asymmetries between the input and the output pulses. When voltage level at out P2 again falls back to the low level, a series circuit of diode D2 and Zener diode Z3 should normally not conduct. This is achieved if Z3 has a rated value of 15 V, for example. Thereby C3 remains charged.

The charged capacitor C3 is intended to turn on the transistor Q1. For this purpose a capacitor C2 is charged to a voltage that corresponds to the voltage of C3 minus the gate threshold voltage of Q1. For example, if the voltage at C3 is 15 V, the voltage at C2 ran be 12 V for example. The current for this voltage is briefly drawn from the power grid in the startup process and turns on the monostable relay Rel2.

Shortly after this turning on process, the monostable relay Rel2 must again be turned off so that Q1 is not thermally overloaded. The objective is merely to briefly charge up the power capacitor C1 so that the auxiliary power-supply unit 16 can start. To turn off Rel2, P1 is briefly switched to a high level and then back to a low level. A switching pulse inverted relative to the first switching pulse is fed via the capacitor C4 to T0 and appears at its output as a stepped up negative pulse of e.g., −15 V. Thereby C3 is discharged via D2 and Z3 to roughly 1 V. This lies below the threshold voltage of Q1, so that Q1 is now switched off. Resistor R3 is intended to ensure, by discharging any residual charge from capacitor C3, that the switched off transistor Q1 remains switched off over the long term.

As described above, the monostable relay Rel2 is driven by the two-stage circuit. The first switching stage comprises, in particular, the microcontroller 17, the circuit for monitoring the generated secondary voltage, the battery V1 and the switch Sw2. It is supplied by the battery V1. The microcontroller 17 monitors the front pushbutton Sw2 and the secondary auxiliary voltage 5 Vaux-sec and provides suitable control signals for controlling the second switching stage. The second switching stage comprises, in particular, the MOSFET Q1, the associated control electronics for providing a suitable control signal for its gate terminal and the supply circuit with the auxiliary rectifier BD2 for supplying the relay Rel2 with a suitable switching voltage. The first and second switching stages in the example according to FIG. 4 are galvanically separated from one another by the transformer T0.

Figure 5:
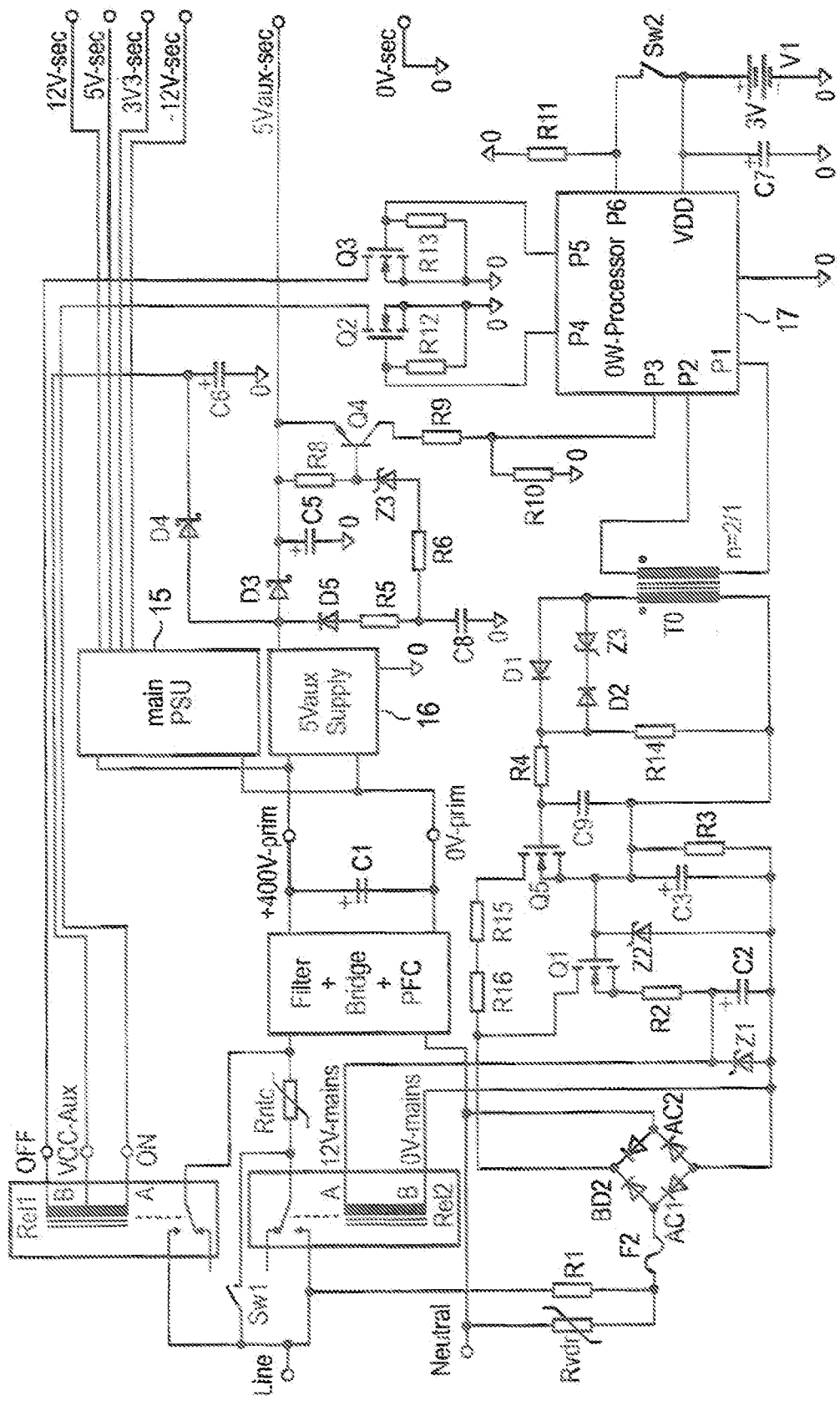
FIG. 5 shows a second control circuit for the power input circuit according to FIG. 3.

FIG. 5 shows another configuration of the control circuit for the power input circuit according to FIG. 3. The power input circuit disclosed therein, as well as the connections for the microcontroller 17 correspond to those of the circuit arrangement according to FIG. 4, wherein the secondary DC voltage outputs 12V-sec, 5V-sec, 3V3-sec and −12-sec of the main power-supply unit 15 are also shown in FIG. 5. In addition, the second switching stage according to FIG. 5 differs from the control circuit according to FIG. 4 as follows.

One advantage of the control circuit according to FIG. 4 is that only one MOSFET transistor Q1 is needed. However, this control circuit must generate a relatively high output voltage by the transformer T0. The arrangement according to FIG. 5 shows that, by adding an additional small-signal MOSFET transistor Q5, the necessary output voltage and thus the transmission ratio of T0 can be reduced.

According to the second example in FIG. 5, the lower terminal of the output winding of T0 is not connected to the lower terminal, but rather to the upper, positive terminal of C3. The control voltage is fed to the MOSFET transistor Q5, which closes the circuit with high ohmic resistors R15 and R16 to charge the capacitor C3. A Zener diode Z2 limits the control voltage to a constant value. In this control circuit the relay voltage can be selected to be higher, e.g., 24 V or 48 V by selecting the rated voltage of Z2, to lower the relay current and thus the power loss in Q1.

Figure 6:
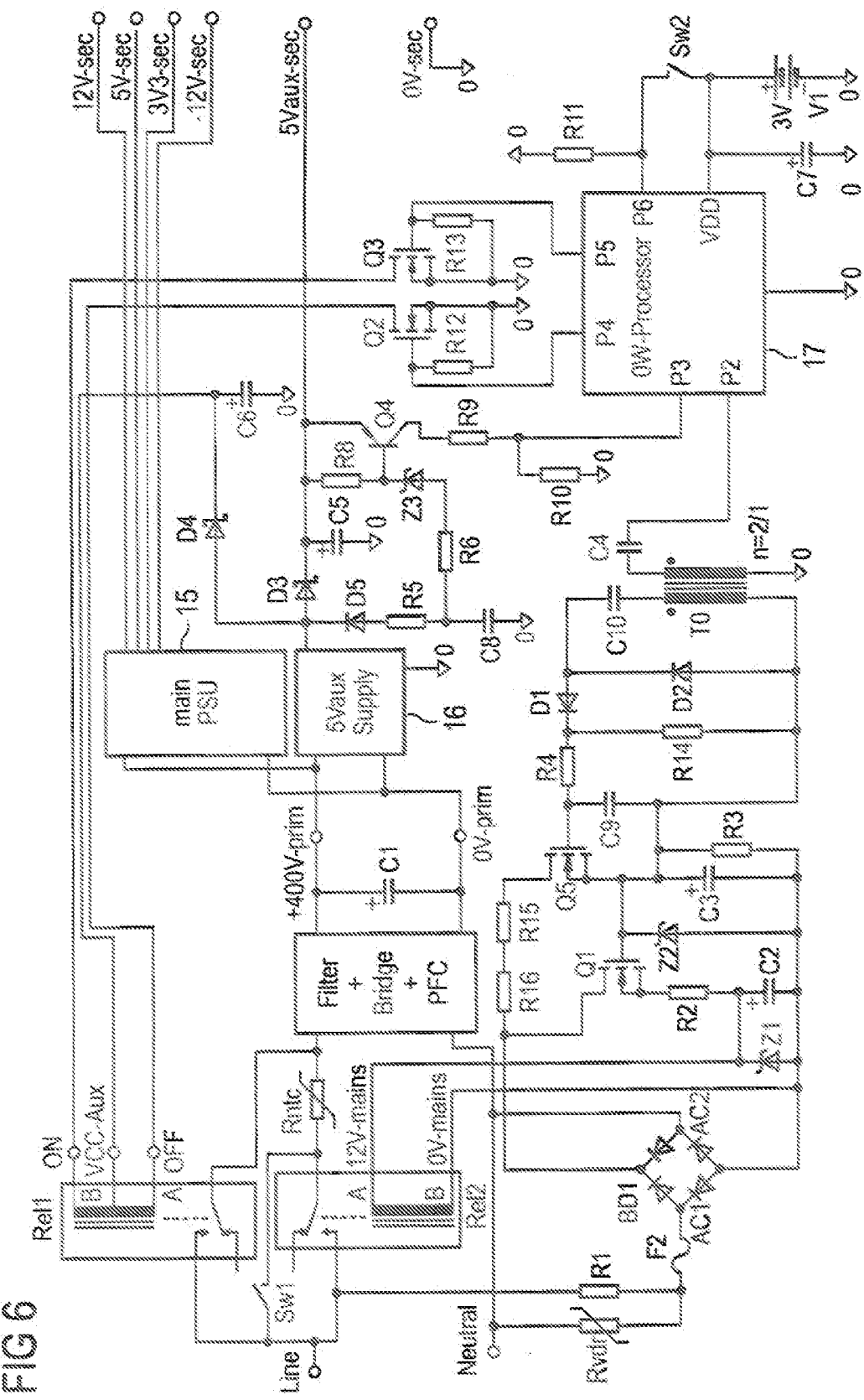
FIG. 6 shows a third control circuit for the power input circuit according to FIG. 3.

FIG. 6 shows a third circuit for controlling the power input circuit according to FIG. 3. The circuit according to FIG. 6 also substantially corresponds to the circuit of the above-described FIG. 4 with respect to the power input circuit and the controlling of the microcontroller 17.

In the third control example according to FIG. 6, however, Q5 is not controlled by an on-pulse and an off pulse from P2 and P1, respectively, but instead only by a pulse train at the output P2 of the microcontroller 17. The DC component of the square-wave voltage of P2 is separated out by C4 and recovered on the secondary side with the aid of C10 and D2. The control voltage is applied via D1 and R4 to C9 and the control gate of the MOSFET transistor Q5, which closes the circuit with the high-ohmic resistors R15 and R16 to charge the capacitor C3 when the control voltage is applied. R14 is used to discharge C9, when the driving by P2 is cut off.

Thus the circuit according to FIG. 6 has the same advantages as the circuit according to FIG. 5. In addition, the controlling of the relay Rel2 by the microcontroller 17 can be performed more reliably.

Figure 7:
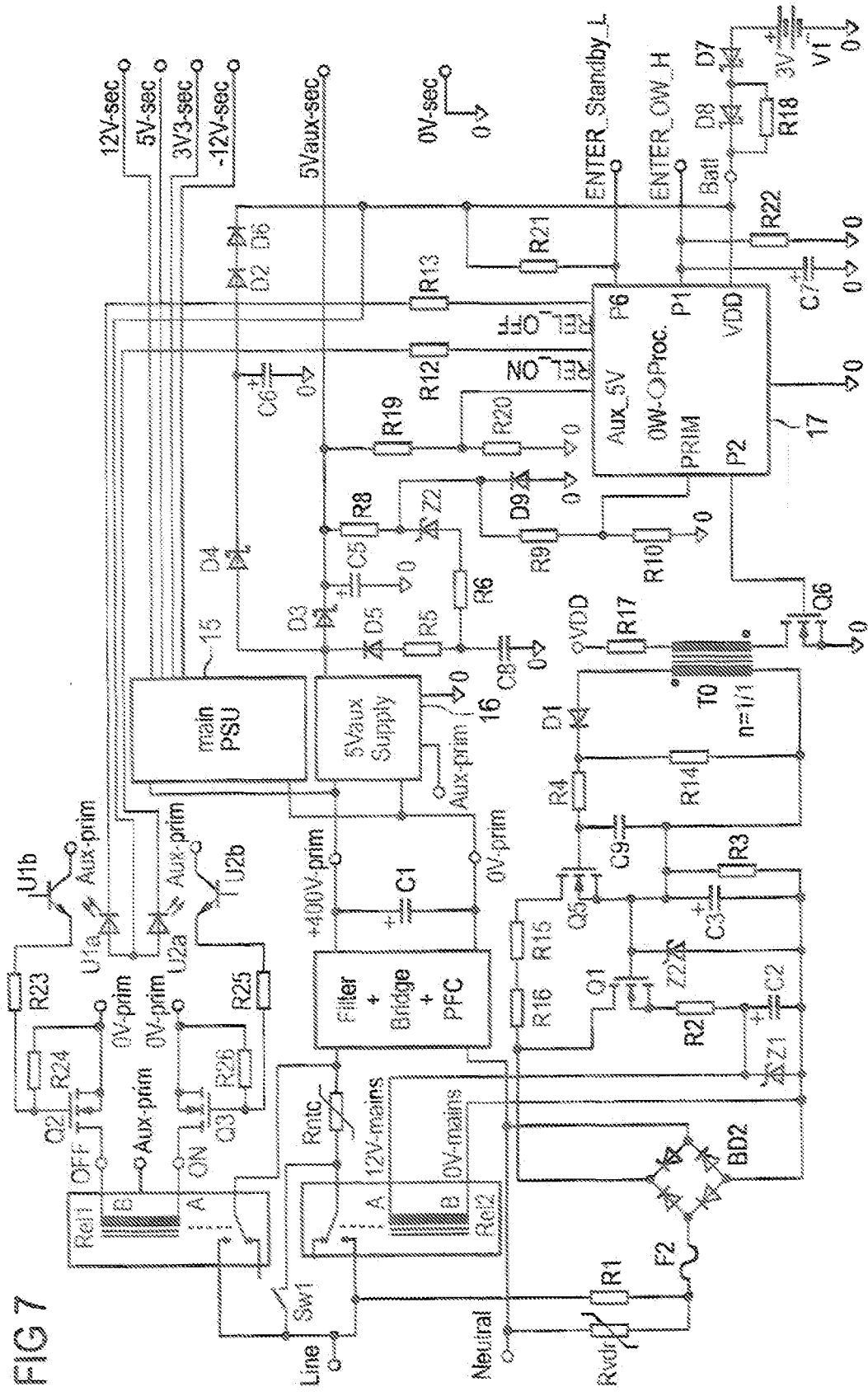
FIG. 7 shows a fourth control circuit for the power input circuit according to FIG. 3.

FIG. 7 shows a fourth control circuit for controlling the power input circuit according to FIG. 3. In comparison to the previous circuit arrangements, the controlling of the monostable relay Rel2 and the bistable relay Rel1 is further improved, as is the monitoring of the voltages generated by the auxiliary power-supply unit 16.

In the fourth control example according to FIG. 7, the transformer T0 is used for controlling Q5 not as a pulse transformer but as a flyback converter. With this principle, the control energy is optimally utilized. Terminal P2 controls the transistor Q6, which connects the primary side of T0 to a battery voltage VDD and thereby stores magnetization energy in T0. D1 blocks at this point in time. If Q6 is then turned off, the transformer T0 demagnetizes by charging the capacitor C9 via D1 and R4 on the secondary side. Depending on the dimensioning of the circuit, a single switching pulse or several switching pulses are generated at the terminal P2 to charge the capacitor C9. The control voltage turns on the MOSFET transistor Q5 via its control gate. R14 is used to discharge C9, when the driving by P2 is cut off. The remaining part of the controlling of the relay Rel2 is unchanged with respect to the preceding configuration.

In this configuration of the control circuit, the manner in which the operating coil of the relay Rel1 can be supplied from the primary side with an operating current is shown in the drawing. This has the advantage that the safety regulations to be complied with are no longer as strict because primary/secondary separation is no longer necessary and therefore a less expensive relay can be used. Optocouplers U1a, U1b and U2a, U2b, respectively used in FIG. 7 for controlling the relay Rel are substantially more cost-effective, so that the overall price for the circuit arrangement is lower despite the use of more components.

Another possibility for saving costs is for Rel1 to be driven such that a current surge never flows across this relay. In this case, the contacts of the relay can be designed to be markedly thinner without shortening the service life. Thereby there is the possibility of using a less expensive relay. For this purpose, Rel2 must be triggered shortly before and while Rel1 is closed, and also shortly before and while it is opened. Thereby no current surge occurs during the closing of Rel1, and no inductive overvoltage can result from the inductors of the filter during the opening process. Rel2 is protected by the NTC Rntc during the closing process and must be designed for the maximum current surge of the power-supply unit and for overvoltages in any case, so that no increased costs result.

In the circuit according to FIG. 7, the supply of the 0W processor 17 by both a 3 V button cell and the auxiliary power-supply unit 16 is shown, so that the battery is subjected to a load only briefly, during startup. The diodes D8 and D7 are provided to protect the lithium battery against impermissible charging by the auxiliary power-supply unit 16, should one of the two diodes be bridged. D2 and D6 step down the auxiliary voltage so that it is matched better to the range of the processor supply voltage.

If sufficient processor inputs are present, it is advantageous to measure the primary voltage via input PRIM and the secondary voltage separately via input Aux_5V. The circuits shown in FIGS. 3-7 have in common that the bistable relay Rel1 is to be shut off in case of a power-grid failure to avoid current surges and resultant damage to the circuits when a and voltage is again applied. A function for automatic mains restart can be implemented by periodically turning Rel2 on a short time for a test of whether the grid voltage is again available. At the same time however the service life of the relay Rel2 must be considered. For this purpose the intervals between the power-on attempts can be increased over time or completely terminated after a set number of power-on attempts.

Figure 8:
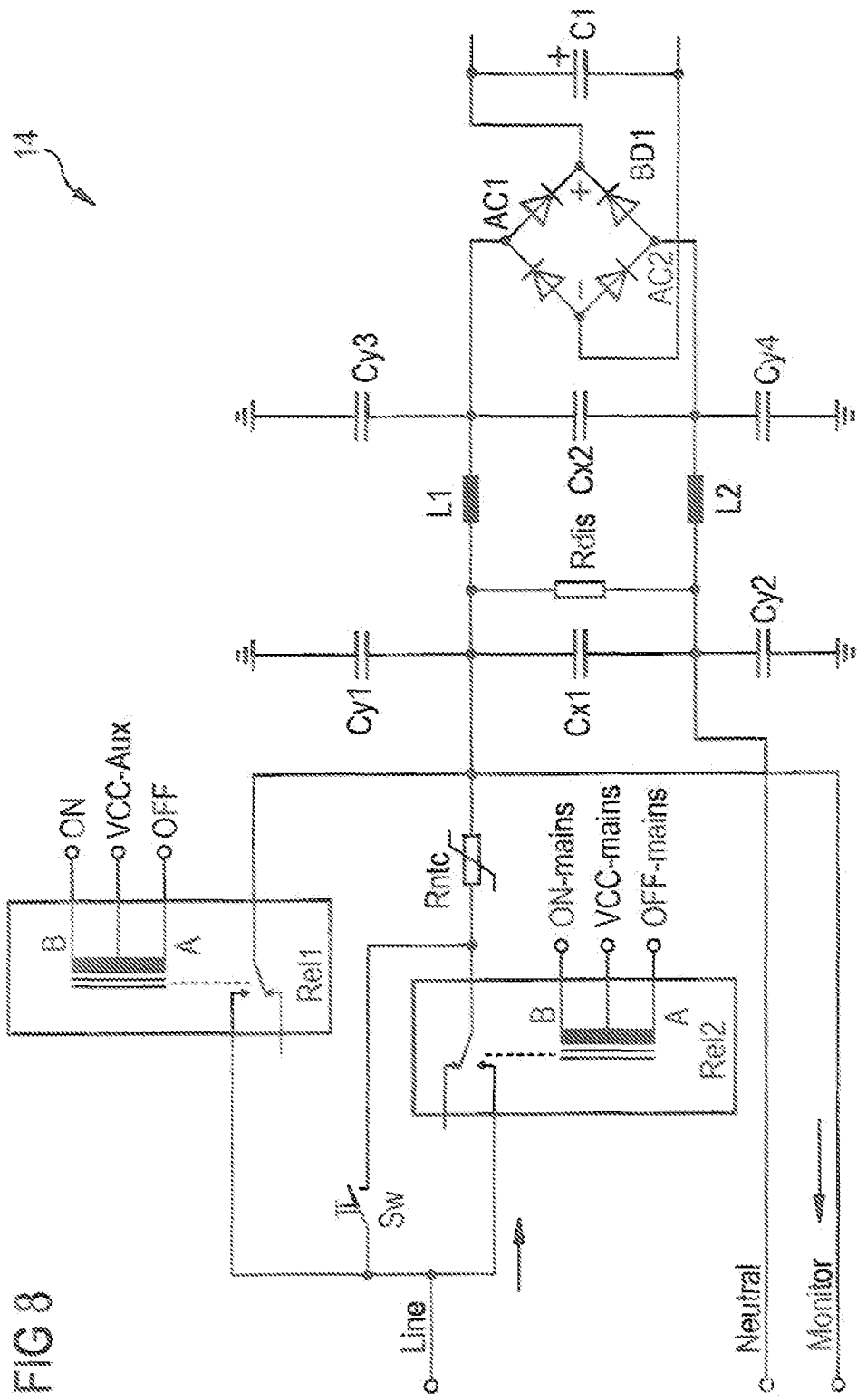
FIG. 8 shows a second power input circuit.
Figure 9:
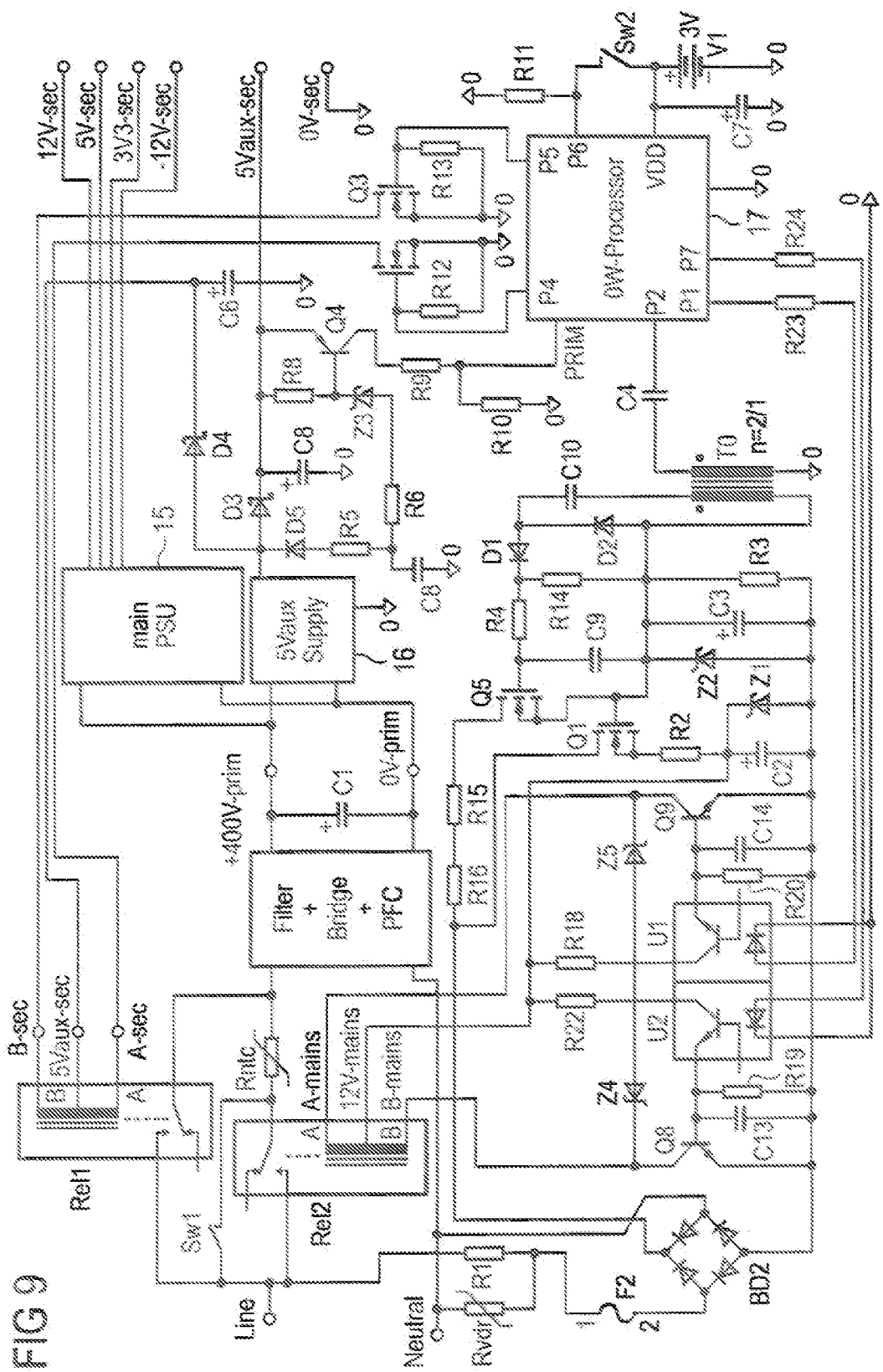
FIG. 9 shows a control circuit for the power input circuit according to FIG. 8.

On the other hand, if it is absolutely necessary to allow mains restart at any time, for server systems for example, then the relay Rel2 can also be implemented as a bistable relay. FIG. 8 shows a suitable power input circuit 14 with two bistable relays Rel1 and Rel2, and FIG. 9 shows an associated circuit arrangement with a complete circuit for controlling the power input circuit 14.

In this example, a second bistable relay Rel2 is permanently turned on by the microcontroller 17 upon recognition of a power-grid failure, and a first bistable relay Rel1 is turned off. Only after recognition that the power grid voltage is again available is the first bistable relay Rel1 switched on and the second bistable relay Rel2 switched back off if desired.

if two bistable relays are used, relay Rel2 remains turned on if a conventional supply of the auxiliary power supply unit 16 is desired. Rel1 is additionally connected when the auxiliary power-supply unit 16 has started. In case of a power-grid failure, Rel1 must be turned off even here, but Rel2 remains turned on. Rel2 is turned off only if a 0W standby mode is desired, for example via a keyboard or software request.

The bistable relay Rel2 is supplied from the power grid via one of the above-mentioned driver circuits, but the actuation direction (on or off) is determined via one of optocouplers U1 or U2. Of course the other previously mentioned supply circuits are also possible. Rel1 can also be actuated from the primary side as described above.

FIGS. 10 and 11 again show improved power input circuits 14, in which the first switching element 3 is constructed as a semiconductor switching element.

Figure 10:
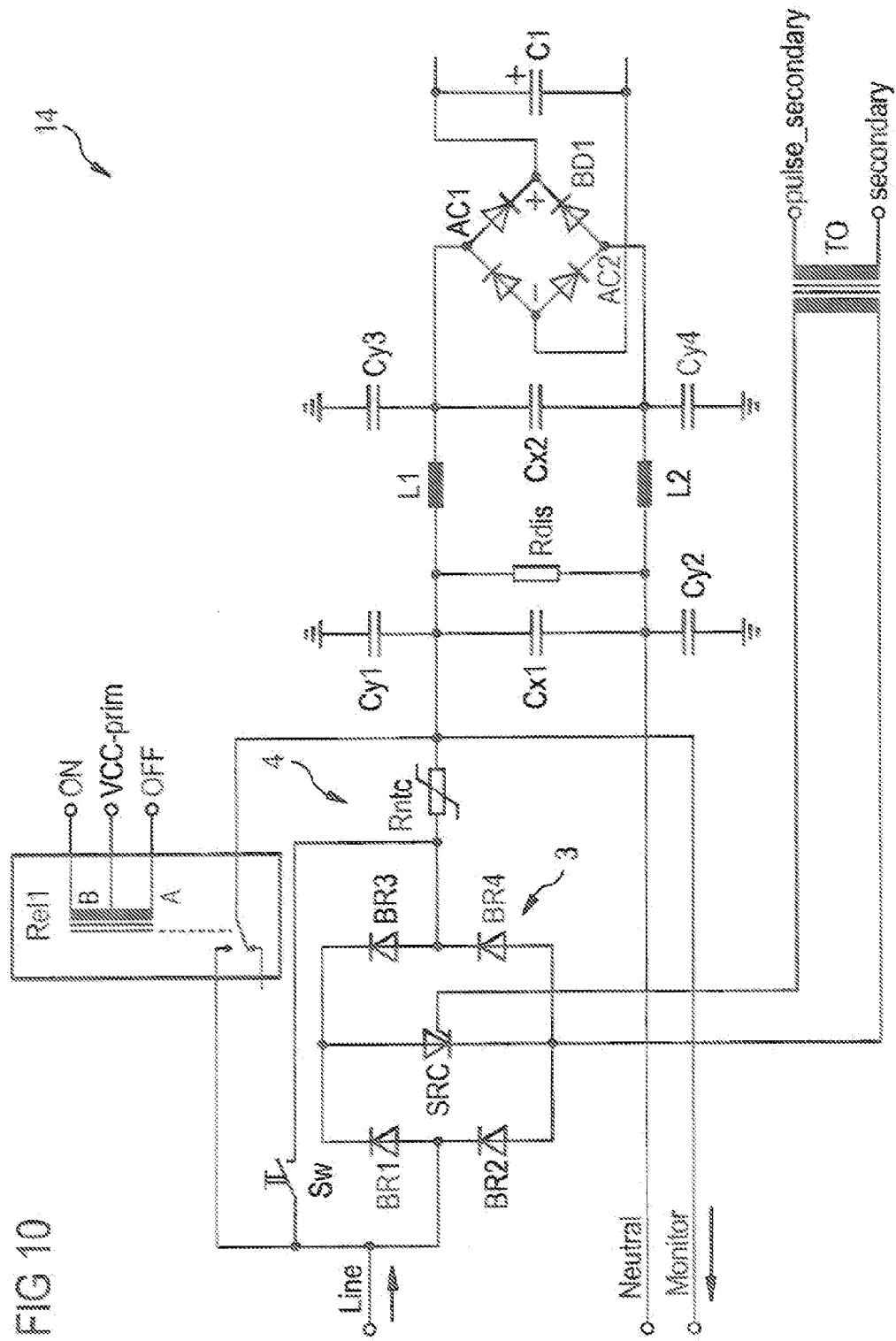
FIG. 10 shows a third power input circuit.
Figure 11:
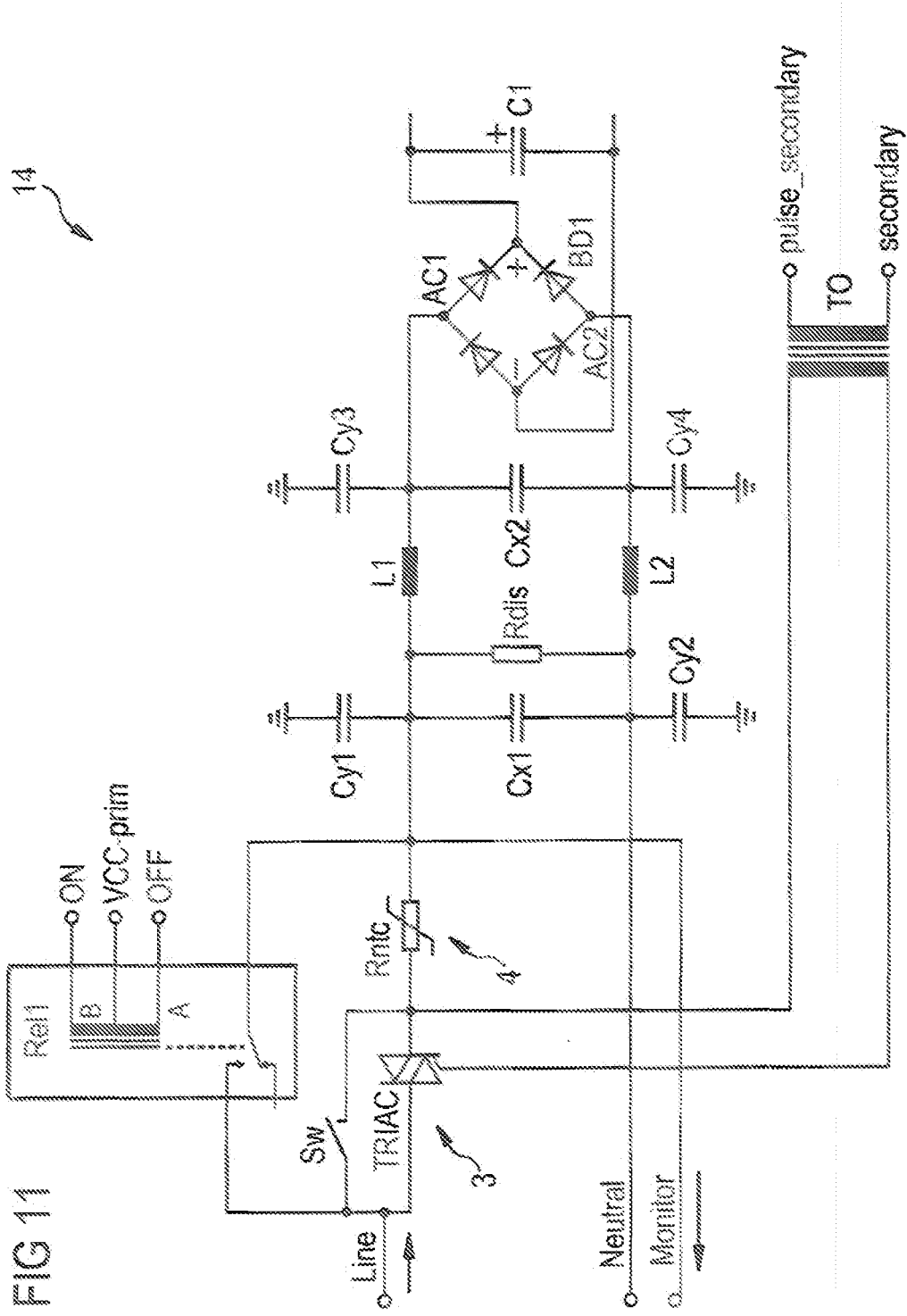
FIG. 11 shows a fourth power input circuit.

According to FIG. 10, a rectifier bridge constructed of four diodes BR1-BR4 with a thyristor SCR arranged in the positive path of the rectifier bridge is used as the first switching element 3. According to FIG. 11, a symistor TRIAC, also known as a triac, is used as switching element 3. The use of a thyristor or a symistor for switching the current-limiting element 4, such as the NTC thermistor Rntc, has the advantage that one can do entirely without the second relay Rel2. In addition, semiconductor switching elements have the advantage that they have a considerably longer service life. The circuit according to FIG. 11 is less expensive to manufacture, but requires a drive current of roughly 5 mA for the symistor, whereas the thyristor SCR according to FIG. 10 requires a drive current of only 0.2 mA.

A transformer T0, which can be connected, like the pulse transformer described in FIGS. 4-7, either as a pulse transformer or as a flyback converter, is again used to control the semiconductor switching elements SCR and TRIAc, respectively.

Figure 12:
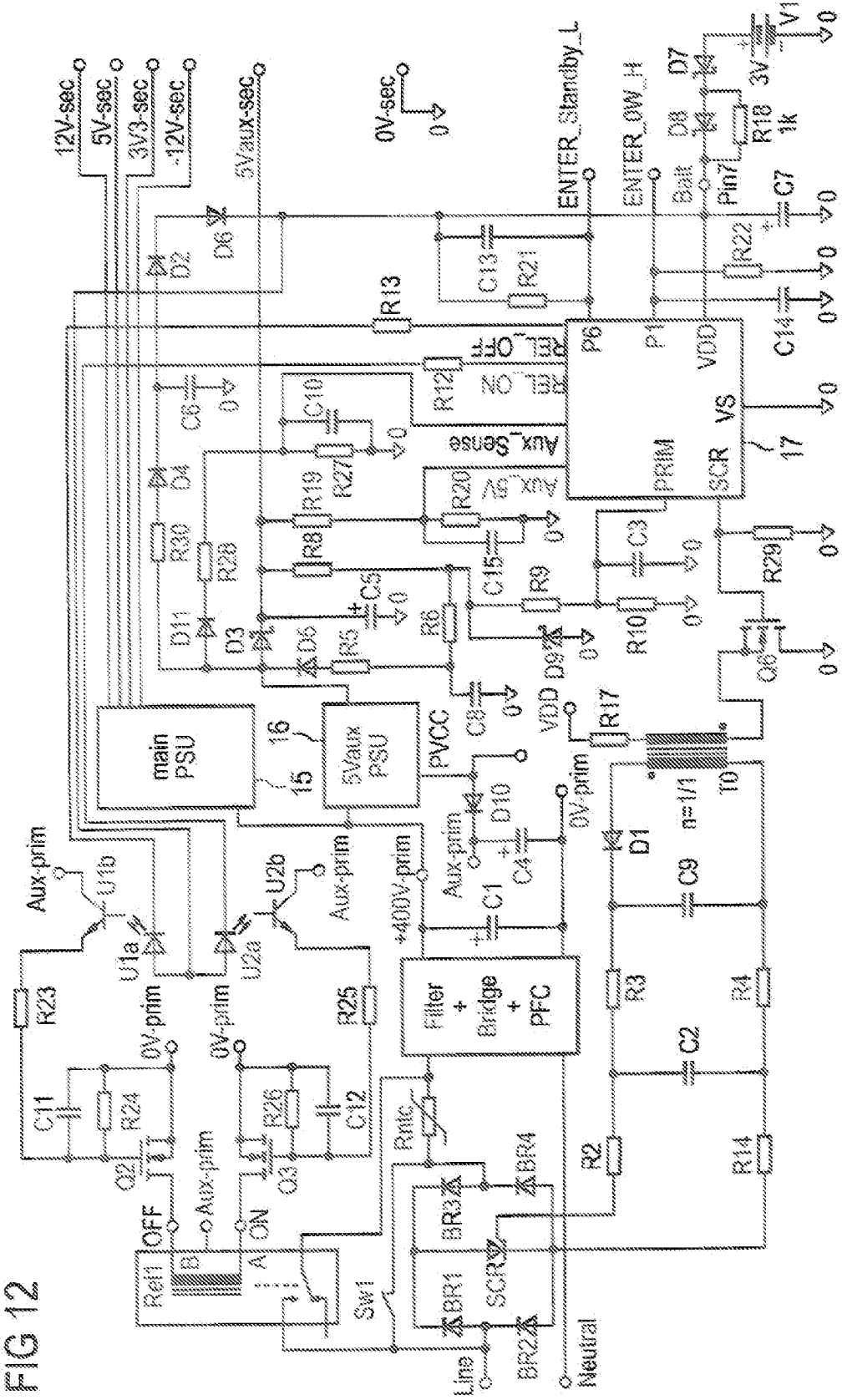
FIG. 12 shows a control circuit for the power input circuit according to FIG. 10 or 11.

FIG. 12 shows a possible control circuit for the power input circuit 14 according to FIG. 10.

The transformer T0 operates here, for example, in the flyback converter mode, and the bistable relay Rel1 is shown with primary/primary separation. Resistors R2, R3, R4, R14 and the smoothing capacitor C2 in the drive circuit for the thyristor SCR reduce the HF interference fed into the mains input Line, but are not necessary for the functioning of the circuit arrangement.

In comparison to the circuit arrangement according to FIG. 9, the part of the circuit for monitoring the primary voltage via the terminal PRIM of the microcontroller 17, the Zener diode Z3 has been eliminated. The voltage divider consisting of the resistors R6 and R8 must therefore be redimensioned somewhat, but the cost for the Zener diode Z3 is saved.

in addition, a circuit for monitoring a signal Aux_Sense from the microcontroller 17 was added. By means of the associated monitoring circuit, an abrupt load rejection of the auxiliary voltage 5 Vaux-sec, caused for example by abrupt load variations of the connected components, can be recognized. Such a load variation can therefore be distinguished from a decrease of the primary voltage and serves in this case to prevent an undesired opening of the bistable relay Rel1.

In principle, the power circuit according to FIG. 11 is controlled by the symistor TRIAC in exactly the same way as the control by the thyristor SCR, and is therefore not shown.

in these examples of the power circuit according to FIGS. 10 and 11, is even easier for Rel1 to be controlled in such a manner that a current surge never flows across this relay Rel1. For this purpose the thyristor SCR or symistor TRIAC must be triggered shortly before and while Rel2 is closed and also shortly before and while it is opened. Thereby no current surge occurs during the closing process of Rel1, and no inductive overvoltage can result from the inductors of the filter during the opening process. A symistor TRIAC or thyristor SRC has no wear in principle, so that no reduction of service life occurs due to this additional switching, but there is an increase in the service life of Rel1. The battery is not additionally loaded either, since Rel1 is switched on and off while power is available from the auxiliary power-simply unit 16.

Another advantage is the improved behavior after a power failure that then becomes possible. After a power failure, the power input generally remains in the off-state until it again receives a start command from the secondary side.

With the aid of the processor 17 and the thyristor SCR or symistor TRIAC, it is now possible to make as many startup attempts as desired, without the appearance of wear problems. The startup attempts are of course only necessary if the power-supply unit previously was in a standby or operating state, in the standby operation case, this state must therefore be stored in case of a power failure, and restart attempts must begin immediately thereafter. These can be staggered over time, e.g., 100 startup attempts one second apart, than 100 startup attempts two seconds apart, etc.

Figure 13:
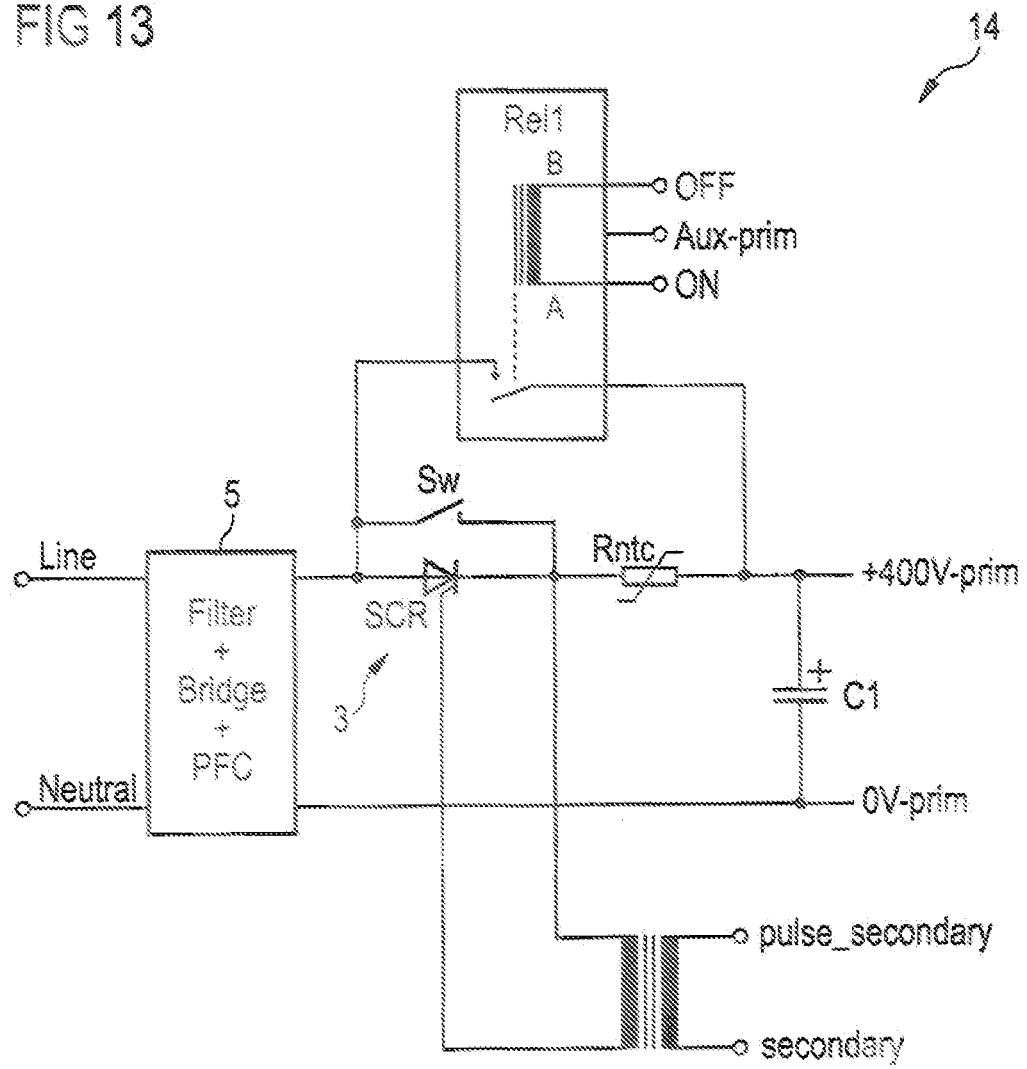
FIG. 13 shows a fifth power input circuit.

FIG. 13 shows an alternative arrangement of the individual components of the power input circuit 14. In particular, the filter circuit 5 comprising a line filter, a circuit for power factor correction and a bridge rectifier in the power input circuit 14 in FIG. 13 has been moved directly adjacent to the phase terminal Line, on the side of the power grid 2, and thus electrically upstream of the switching element 3 and the bistable relay Rel1.

The position of the switching element 3 in FIG. 13 the example with a thyristor SCR for example, is shifted backwards in the direction of the power capacitor C1. With active power factor correction, this has the advantage that smaller currents flow here, especially in case of a low power grid voltage, since the capacitor C1 has a charge voltage of roughly 400 V for a 230 V AC power grid when a main power-supply unit (not shown) is switched on.

in comparison to the previously described arrangements, the circuit arrangement according to FIG. 13 has the disadvantage that, when the power input circuit 14 is switched off, a certain amount of reactive power and a very small amount of active power are consumed in the not-yet switched off filter circuit 5. The advantage and the disadvantage must be weighed against one another depending on the requirements for disconnecting from the power grid.

The thyristor SCR no longer requires an additional bridge rectifier in the arrangement according to FIG. 13, since it is arranged in the DC branch downstream of the main bridge rectifier comprised in the filter circuit 5.

The control circuits 10 described above with reference to FIGS. 1-12 are likewise suitable for controlling the mains input circuit 14 represented in FIG. 13 and will therefore not be described again.

The examples shown in FIGS. 1-13 have in common that, in an additional energy-saving mode referred to in this application as 0W standby, they further reduce or completely avoid power consumption of a power-supply unit, in particular a computer power-supply unit. In this manner the various circuit arrangements and the associated control circuits provide an additional contribution to energy saving for computer systems which goes beyond the previously known energy-saving states in accordance with the ACPI standard. The operating state disclosed herein lies between the states referred to as G3 ("mechanical off") and G2 ("soft-off").

The invention claimed is:

1. A circuit arrangement for a power-supply unit for generating at least one DC voltage from an AC voltage of a power grid comprising:
    a switching element that switches a load current of the power-supply unit;
    a current-limiting element connected in series to the switching element that limits a current surge when the switching element is turned on;
    a bistable first relay connected in parallel to the switching element and the current-limiting element that retains the load current; and
    a control circuit that switches the power-supply unit from a first operating state, in which no load current flows from the power grid to the power-supply unit, to a second operating state in which a load current for generating a DC voltage flows from the power grid to the power-supply unit;
    wherein the control circuit turns on the switching element for a first time period during switching of the power-supply unit from the first to the second operating state, to turn the bistable relay on during the first time period, and to turn the switching element off at the end of the first time period.

2. The circuit arrangement according to claim 1, further comprising a first switching stage that comprises an energy storage device that supplies the first switching stage, and an operating element, wherein the first switching stage is set up to generate a first control signal when the operating element is actuated, and a second switching stage coupled to the first switching stage that comprises an amplifier element for generating a second control signal for controlling the switching element.

3. The circuit arrangement according to claim 2, wherein the switching element comprises a second relay and the second switching stage comprises a supply circuit for supplying the second relay with an operating voltage obtained from the power grid.

4. The circuit arrangement according to claim 3, wherein the second relay is configured as a monostable relay and the second switching stage supplies the second relay during the first time period with an operating voltage obtained from the power grid.

5. The circuit arrangement according to claim 3, wherein the second relay is configured as a bistable relay, the second switching stage supplies the second relay at the beginning of the first time period with a make pulse obtained from the power grid, and with a break pulse derived from the power grid at the end of the second time period.

6. The circuit arrangement according to claim 1, wherein the switching element is a semiconductor switching element, in particular a thyristor (SCR) or a symistor (TRIAC).

7. The circuit arrangement according to claim 6, wherein the semiconductor switching element is configured as a thyristor (SCR) and the thyristor (SCR) is arranged in a bridge circuit connected to the power grid in such a manner that by switching the thyristor (SCR), both positive and negative half-waves of the AC voltage from the power grid can be switched.

8. The circuit arrangement according to claim 1, wherein the power-supply unit comprises a main power-supply unit that provides at least one operating voltage and an auxiliary power-supply unit that provides an auxiliary voltage, wherein the main power-supply unit and the auxiliary power-supply unit are disconnected in the first operating state by the switching element and the first relay from the power grid, and in the second operating state, the main power-supply unit and/or the auxiliary power-supply unit are coupled by the switching element and/or the first relay to the power grid.

9. The circuit arrangement according to claim 8, wherein the first relay is supplied during a first period of time with a make pulse by the auxiliary power-supply unit.

10. The circuit arrangement according to claim 8, wherein, in the switching of the at least one power-supply unit from the first operating state into the second operating state, the auxiliary power-supply unit is first activated in a first switching phase, and the main power-supply unit is activated in a second switching phase.

11. The circuit arrangement according to claim 1, wherein the control circuit comprises a microcontroller that controls the switching element and the first relay.

12. The circuit arrangement according to claim 11, wherein the microcontroller is operated in the first operating mode at a first clock frequency, and at a second clock frequency in the second operating mode, the first clock frequency being lower than the second clock frequency.

13. The circuit arrangement according to claim 11, wherein the microcontroller monitors the at least one DC voltage generated by the power-supply unit and the AC voltage of the power grid.

14. The circuit arrangement according to claim 11, wherein the control circuit comprises a transformer, and the microcontroller generates at least one pulsed control signal to trigger the switching element, wherein this signal is transmitted via the transformer.

15. The circuit arrangement according to claim 14, wherein the control circuit comprises a flyback converter circuit to drive the switching element, wherein the integrated circuit controls the flyback converter circuit.

16. The circuit arrangement according to claim 1, further comprising a filter circuit that can be connected to the power grid and comprises at least one network filter and a rectifier circuit, wherein the switching element is arranged between the filter circuit and the at least one power-supply unit.

17. The circuit arrangement according to claim 1, further comprising a filter circuit comprising at least one network filter and a rectifier circuit, wherein the switching element is arranged between the power grid and the filter circuit.

18. The circuit arrangement according to claim 1, wherein the control circuit switches the power-supply unit from the second operating state into the first operating state, to turn on the switching element for a second time period during the switching of the power-supply unit from the second into the first operating state, to turn off the bistable relay during the second time period, and to turn off the switching element at the end of the second time period.

19. The circuit arrangement according to claim 18, wherein the control circuit monitors the AC voltage of the power grid and switches the power-supply unit from the second into the first operating state upon recognition of a power-grid fault.

20. A control circuit for switching a power supply unit from a first operating state, in which no load current flows from a power grid to the power-supply unit, into a second operating state, in which a load current for generating a DC voltage flows from the power grid to the power-supply unit comprising:
    a first switching stage having an energy storage device that operates the first switching stage and an activation element, wherein the first switching stage monitors the activation element in the first operating state and, upon recognizing an activation signal from the activation element, generates a first control signal, and a second switching stage coupled to the first switching stage and having at least one amplifier element for controlling a relay with a second control signal and a supply circuit that supplies the second switching stage with a supply voltage obtained from the power grid, wherein the second switching stage supplies the relay to switch a load current of the power-supply unit with the supply voltage when the first control signal is received.

21. The control circuit according to claim 20, wherein the first switching stage generates at least one voltage pulse as a first control signal and transmits it to the second switching stage, and the second switching stage activates the supply circuit only when the voltage pulse has been received.

22. The control circuit according to claim 20, wherein the first switching stage and the second switching stage are galvanically separated from one another by a transformer or an optocoupler.

23. The control circuit according to claim 20, wherein the second switching stage comprises a semiconductor switching element to activate the supply circuit, the first switching stage is coupled to a control terminal of the semiconductor switching element.

24. The control circuit according to claim 23, wherein, in the first operating state, voltage drop on the semiconductor switching element is essentially the entire electric voltage of the power grid.

25. A computer power-supply unit with a circuit arrangement according to claim 1.

26. A method for switching a power-supply unit for generating at least one DC voltage from an AC voltage of a power grid comprising the following steps performed by a control circuit during switching of the power-supply unit from a first operating state into a second operating state:

at the beginning of a first time period, turning on a circuit element connected in series to a current-limiting element to switch a load current of the power-supply unit, during the first time period, turning on a bistable first relay to retain the load current, wherein the relay is connected in parallel to the switching element and the current-limiting element, and turning off the switching element at the end of the first time period.

27. The method according to claim 26, wherein the following steps are performed by a control circuit during the switching of the power-supply unit from the second operating state into the first operating state:

turning on the switching element at the beginning of a second time period, turning off the second relay during the second time period, and turning off the switching element at the end of the first time period.

28. The method according to claim 27, wherein the control circuit monitors the AC voltage of the power grid in the second operating state and switches the power-supply unit from the second into the first operating state upon recognition of a power-grid fault.

29. The method according to claim 28, wherein the control circuit, after a predetermined period of time following recognition of the power-grid fault and switching of the power-supply unit into the first operating state, attempts to switch the power-supply unit from the first operating state into the second operating state.

30. A computer power-supply unit with a control circuit according to claim 20.

* * * * *